US012582920B2

(12) United States Patent
Hughes et al.

(10) Patent No.: US 12,582,920 B2
(45) Date of Patent: Mar. 24, 2026

(54) TOY

(71) Applicant: GOLDEN BEAR PRODUCTS LIMITED, Shropshire (GB)

(72) Inventors: Barry Hughes, Telford (GB); Gareth Lloyd, Telford (GB); Chris Marsden, Telford (GB); Oliver Hales, Telford (GB)

(73) Assignee: GOLDEN BEAR PRODUCTS LIMITED, Shropshire (GB)

( * ) Notice: Subject to any disclaimer, the term of this patent is extended or adjusted under 35 U.S.C. 154(b) by 167 days.

(21) Appl. No.: 18/484,159

(22) Filed: Oct. 10, 2023

(65) Prior Publication Data

US 2025/0114718 A1 Apr. 10, 2025

(30) Foreign Application Priority Data

Oct. 4, 2023 (GB) ...................................... 2315223

(51) Int. Cl.
*A63H 17/26* (2006.01)
*A63H 17/36* (2006.01)
(Continued)

(52) U.S. Cl.
CPC ........... *A63H 17/262* (2013.01); *A63H 17/36* (2013.01); *A63H 29/22* (2013.01); *G05D 1/0276* (2013.01); *G05D 1/12* (2013.01); *A63H 2200/00* (2013.01)

(58) Field of Classification Search
CPC ...... A63H 17/262; A63H 17/36; A63H 29/22; A63H 2200/00; G05D 1/0276; G05D 1/12
See application file for complete search history.

(56) References Cited

U.S. PATENT DOCUMENTS 6,482,064 B1 * 11/2002 Lund ..................... A63H 17/395
446/175
11,199,853 B1 * 12/2021 Afrouzi .................. B25J 13/006
(Continued)

FOREIGN PATENT DOCUMENTS

| CN | 204543539 U | 8/2015 |
| JP | 2000079283 A | 3/2000 |
| WO | 03037469 A1 | 5/2003 |

OTHER PUBLICATIONS

Chivarov, N., "Infrared Ball Chasing Robot," Workshop on Supplemental Ways for Improving International Stablity (SWIIS 2010), Oct. 27-29, 2010, Prishtina, Kosovo, pp. 73-76.
(Continued)

*Primary Examiner* — Malina D. Blaise
(74) *Attorney, Agent, or Firm* — McKee, Voorhees & Sease, PLC

(57) ABSTRACT

There is provided a toy, including a ball chasing robot including: a controller configured to receive power from a battery a plurality of infrared sensors configured to detect infrared radiation emitted by a satellite object, the plurality of infrared sensors connected to the controller; a motor configured to drive a wheel arrangement, the wheel arrangement including at least two drive wheels, wherein: the controller is configured to control the motor and wheel arrangement to drive the ball chasing robot towards the infrared radiation emitted by the satellite object detected by the plurality of infrared sensors; wherein the ball chasing robot includes a plurality of settings, including: a play setting, wherein the controller is configured to control the motor, such that the ball chasing robot is driven towards the source of the infrared radiation emitted by the satellite object, and a sleep setting wherein the controller is configured to turn off the plurality of sensors, wherein the sleep setting is entered automatically after a period of inactivity;

(Continued)

and/or: a hard floor setting, wherein the motor is configured to drive the wheel arrangement at a first power setting, and a carpet setting, wherein the motor is configured to drive the wheel arrangement at a second power setting.

12 Claims, 2 Drawing Sheets

(51) Int. Cl.
    *A63H 29/22*         (2006.01)
    *G05D 1/00*          (2006.01)

(56)                References Cited

U.S. PATENT DOCUMENTS

| | | | | |
|---|---|---|---|---|
| 11,291,923 | B2* | 4/2022 | Hirose | H04N 7/18 |
| 2008/0108277 | A1* | 5/2008 | Nunez Serrano | A63H 11/00 |
| | | | | 446/353 |
| 2011/0269374 | A1* | 11/2011 | Hornsby | A63H 17/36 |
| | | | | 446/484 |
| 2015/0147936 | A1* | 5/2015 | Hornsby | A63H 17/36 |
| | | | | 446/456 |
| 2018/0229135 | A1* | 8/2018 | Cao | A63H 17/262 |
| 2020/0409376 | A1* | 12/2020 | Ebrahimi Afrouzi | |
| | | | | G05D 1/0214 |

OTHER PUBLICATIONS

Extended European Search Report in EP24204674.6, mailed Feb. 10, 2025, 11 pages.

* cited by examiner

TOY

CROSS REFERENCE TO RELATED APPLICATIONS

This is a Paris Convention application claiming priority to GB2315223.4, filed Oct. 4, 2023, the entire contents of which are hereby expressly incorporated by reference in their entirety including, without limitation, the specification, claims, and abstract, as well as any figures, tables, or drawings thereof.

FIELD

This specification relates to a toy. More particularly, although not exclusively, this specification relates to a toy including a ball chasing robot.

BACKGROUND

Robots for tracking objects may use AI camera capturing. AI camera capturing involves using artificial intelligence algorithms to capture and process images or videos in real-time. The AI camera can identify and track objects, recognize faces, and detect movements or anomalies. AI camera capturing is generally used in higher-priced electronic products such as mobile phones, surveillance cameras, game controllers, etc., as the price of these sensors is relatively high. The accuracy of AI algorithms can be affected by various factors such as lighting conditions, camera angles, and object occlusions, leading to false positives or false negatives. Further, AI camera capturing presents an issue of privacy and data security. As AI cameras capture and process large amounts of data, there is a risk of sensitive information being compromised or misused.

It is an object of the invention to provide a simple, reliable, toy that is able to track another device and to address at least some of the aforementioned issues with known devices.

BRIEF DESCRIPTION OF THE INVENTION

There is provided a toy, including a ball chasing robot including:
  a controller configured to receive power from a battery;
  a plurality of infrared sensors configured to detect infrared radiation emitted by a satellite object, the plurality of infrared sensors connected to the controller;
  a motor configured to drive a wheel arrangement, the wheel arrangement including at least two drive wheels, wherein:
    the controller is configured to control the motor and wheel arrangement to drive the ball chasing robot towards the infrared radiation emitted by the satellite object detected by the plurality of infrared sensors;
  wherein the ball chasing robot includes a plurality of settings, including:
    a play setting, wherein the controller is configured to control the motor, such that the ball chasing robot is driven towards the source of the infrared radiation emitted by the satellite object, and a sleep setting wherein the controller is configured to turn off the plurality of sensors, wherein the sleep setting is entered automatically after a period of inactivity; and/or:
    a hard floor setting, wherein the motor is configured to drive the wheel arrangement at a first power setting, and a carpet setting, wherein the motor is configured to drive the wheel arrangement at a second power setting.

The toy may include the satellite object.

The plurality of infrared sensors may include at least three infrared sensors. The plurality of infrared sensors may be configured to detect infrared radiation in a 360-degree angle around the ball chasing robot.

The first power setting may be a lower power than the second power setting.

The carpet setting may include at least two sub-settings, including:
  a shallow pile carpet setting, wherein the motor is configured to drive the wheel arrangement at the second power setting or a third power setting; and
  a deep pile carpet setting, wherein the motor is configured to drive the wheel arrangement at the second or the third power setting; wherein
  the shallow pile carpet setting and the deep pile carpet setting are different.

When:
  the shallow pile carpet setting is configured such that the motor is configured to drive the wheel arrangement at the second power setting; and
  the deep pile carpet setting is configured such that the motor is configured to drive the wheel arrangement at the third power setting,
    the third power setting may be a higher power than the second power setting.

When:
  the shallow pile carpet setting is configured such that the motor is configured to drive the wheel arrangement at the third power setting; and
  the deep pile carpet setting is configured such that the motor is configured to drive the wheel arrangement at the second power setting,
    the second power setting may be a higher power than the third power setting.

The toy may include a switch configured to switch the ball chasing robot between the hard floor setting and the carpet setting and, if present, the at least two sub-settings.

The toy may further include a wheel torque measuring system. The ball chasing robot may be configured to switch from the hard floor setting to the carpet setting automatically when resistance to rotation exceeds a threshold detected by the wheel torque measuring system.

The wheel arrangement may further include a directional wheel configured to steer the ball chasing robot in the direction of the satellite object.

On detecting an infrared signal from the satellite object, the controller may be configured to revert the ball chasing robot to the play setting.

The toy may further include an accelerometer configured to detect motion of the ball chasing robot. On detecting motion of the ball chasing robot, the controller may be configured to revert the ball chasing robot to the play setting.

The toy may further include a play switch configured to place the ball chasing robot in the play setting or the sleep setting.

When the plurality of infrared sensors do not detect infrared radiation, after a period of non-detection time, the controller may be configured to drive the wheel arrangement such that:
  the ball chasing robot drives in an area, or
  the ball chasing robot spins in place.

When the plurality of infrared sensors detect infrared radiation and subsequently do not detect infrared radiation, the controller may be configured, after a period of non-detection time, to drive the ball chasing robot in a direction of a last known location, the last known location corresponding to a direction in which the plurality of infrared sensors detected infrared radiation and subsequently did not detect infrared radiation.

The satellite object may include at least 5 infrared emitters. The at least 5 infrared emitters positioned within a satellite housing and configured to emit infrared radiation in a 360 degree radius in three dimensions.

The satellite object may include a satellite controller configured to receive power from a satellite battery and configured to place the satellite object into a satellite play setting, wherein the satellite controller is configured to turn on the infrared emitters, and a satellite sleep setting, wherein the controller is configured to turn off the infrared emitters.

The satellite sleep setting may be entered automatically after a period of inactivity.

The ball chasing robot may further include:

at least two motors configured to drive the wheel arrangement.

Each of the at least two motors may be configured to drive each of the at least two drive wheels.

The quantity of the at least two motors may correspond to the quantity of the at least two drive wheels.

There is also provided a toy, including a ball chasing robot including:

a controller configured to receive power from a battery;

a plurality of infrared sensors configured to detect infrared radiation emitted by a satellite object, the plurality of infrared sensors connected to the controller;

a motor configured to drive a wheel arrangement, the wheel arrangement including at least two drive wheels, wherein:

the controller is configured to control the motor and wheel arrangement to drive the ball chasing robot towards the infrared radiation emitted by the satellite object detected by the plurality of infrared sensors;

wherein the ball chasing robot includes a plurality of settings, the plurality of settings including:

a play setting, wherein the controller is configured to control the motor, such that the ball chasing robot is driven towards the source of the infrared radiation emitted by the satellite object, and a sleep setting wherein the controller is configured to turn off the plurality of sensors, wherein the sleep setting is entered automatically after a period of inactivity; and a hard floor setting, wherein the motor is configured to drive the wheel arrangement at a first power setting, and a carpet setting, wherein the motor is configured to drive the wheel arrangement at a second power setting.

There is also provided a toy, including a ball chasing robot and a satellite object, the ball chasing robot including:

a controller configured to receive power from a battery;

a plurality of infrared sensors configured to detect infrared radiation emitted by the satellite object, the plurality of infrared sensors connected to the controller;

a motor configured to drive a wheel arrangement, the wheel arrangement including at least two drive wheels, wherein:

the controller is configured to control the motor and wheel arrangement to drive the ball chasing robot towards the infrared radiation emitted by the satellite object detected by the plurality of infrared sensors;

wherein the ball chasing robot includes a plurality of settings, the plurality of settings including:

a play setting, wherein the controller is configured to control the motor, such that the ball chasing robot is driven towards the source of the infrared radiation emitted by the satellite object, and a sleep setting wherein the controller is configured to turn off the plurality of sensors, wherein the sleep setting is entered automatically after a period of inactivity; and a hard floor setting, wherein the motor is configured to drive the wheel arrangement at a first power setting, and a carpet setting, wherein the motor is configured to drive the wheel arrangement at a second power setting, wherein the first power setting is a lower power than the second power setting, and wherein the ball chasing robot includes a switch configured to switch the ball chasing robot between the hard floor setting and the carpet setting, the satellite object including:

at least five infrared emitters, the at least five emitters positioned on a top portion and a bottom portion of the satellite object.

BRIEF DESCRIPTION OF THE FIGURES

In order that the present disclosure may be more readily understood, preferable embodiments thereof will now be described, by way of example only, with reference to the accompanying drawings, in which.

DETAILED DESCRIPTION OF THE DISCLOSURE

Figures 1, 2:
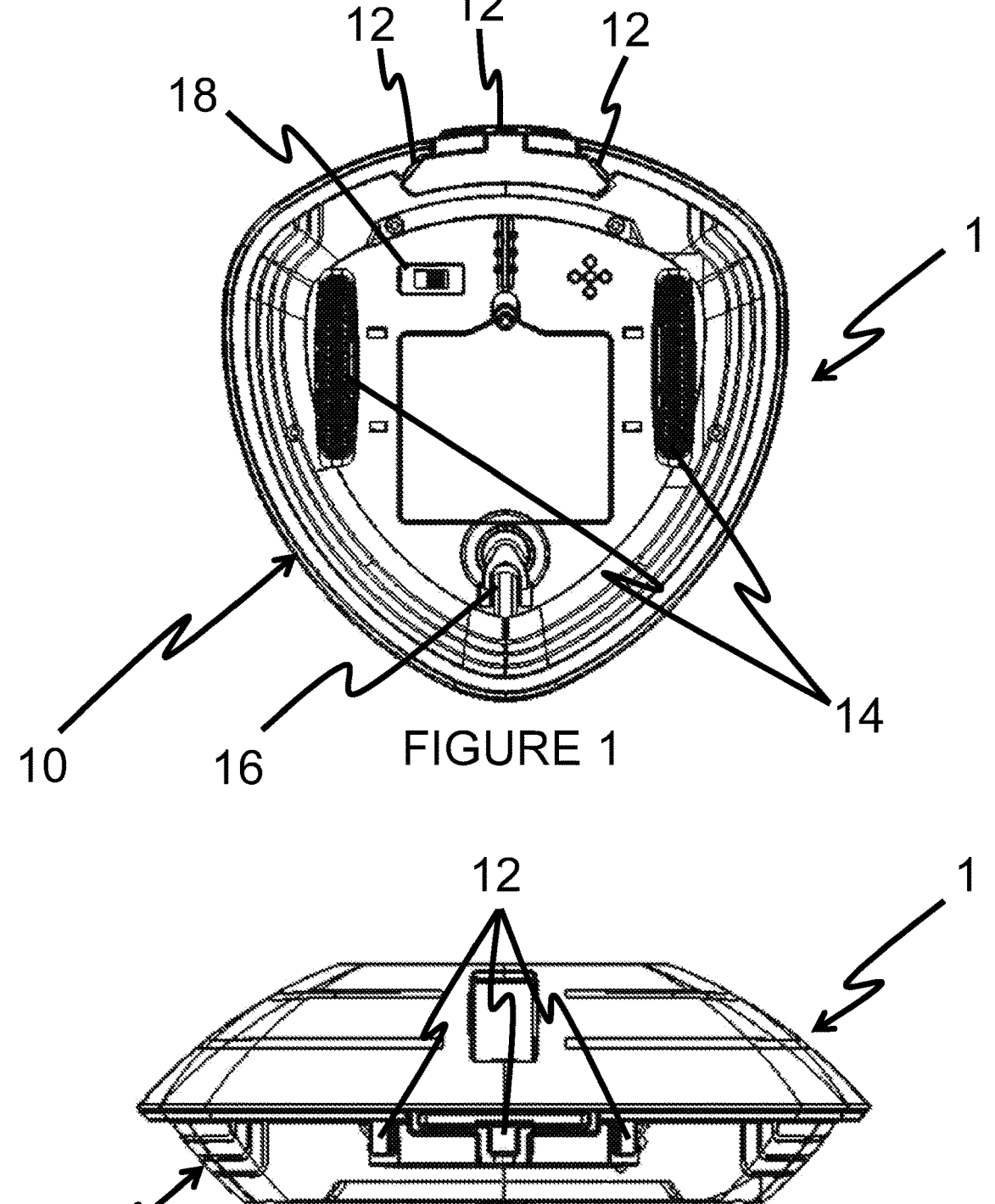
FIG. 1 is a top-down plan view of a ball chasing robot of a toy, embodying the present disclosure.
FIG. 2 is a front side view of the ball chasing robot of FIG. 1.
Figure 3:
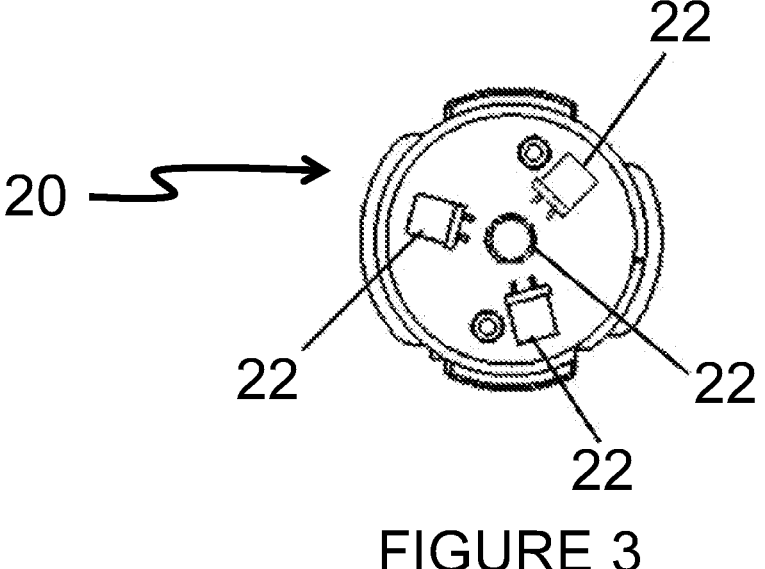
FIG. 3 is a top-down plan view of a satellite object of a toy.

As shown in FIGS. 1 to 4, according to an aspect of the disclosure, there is provided a toy 1, including a ball chasing robot 10. The ball chasing robot 10 includes: a controller configured to receive power from a battery; a plurality of infrared sensors 12 configured to detect infrared radiation emitted by a satellite object 20, the infrared sensors 12 connected to the controller; a motor configured to drive a wheel arrangement, the wheel arrangement including at least two drive wheels 14. The controller is configured to control the motor and wheel arrangement to drive the ball chasing robot 10 towards the infrared radiation emitted by the satellite object 20 detected by the plurality of infrared sensors 12. The toy 1 includes a plurality of settings, including: a play setting, wherein the controller is configured to control the motor, such that the ball chasing robot 10 is driven towards the source of the infrared radiation emitted by the satellite object 20, and a sleep setting wherein the controller is configured to turn off the plurality of infrared sensors 12, wherein the sleep setting is entered automatically after a period of inactivity; and/or: a hard floor setting, wherein the motor is configured to drive the wheel arrangement at a first power setting, and a carpet setting, wherein the motor is configured to drive the wheel arrangement at a second power setting.

When used herein, the term "infrared radiation" may be used interchangeably with the terms "infrared light" and/or "infrared signal".

The ball chasing robot 10 may therefore chase the satellite object 20, in use. The ball chasing robot may otherwise be described as an object chasing robot. The toy 1 may provide advantages. In particular, the toy 1 may be used for sports training, e.g., football (soccer). When used in this way, the satellite object 20 may be a football (soccer ball), as described in more detail, below. The toy 1 may be used on mixed surfaces, such as wood, stone, carpet (including shallow and/or deep pile carpet as described herein). The first power setting and second power setting may be determined by the controller. The plurality of infrared sensors 12 may be able to detect infrared radiation emitted by the satellite object 20 from up to 1.5 metres away.

As will be appreciated by the skilled person, the ball chasing robot 10 may include the motor as described above and a steering and/or gear arrangement to allow for steering of the ball chasing robot 10. Additionally, or alternatively, the ball chasing robot 10 may include a motor for each drive wheel 14, such that each respective motor may drive each respective drive wheel 14 at different speeds based on the controller, allowing for turning of the ball chasing robot 10. In particular, the wheel arrangement may be driven by more than one motor. When provided in this way, the ball chasing robot 10 includes at least two motors configured to drive the wheel arrangement, the at least two motors corresponding to each of the at least two drive wheels. It will be appreciated that the ball chasing robot 10 may include more than two motors and more than two drive wheels 14. There may be provided at least three or at least four drive wheels 14. There may also be a corresponding number of motors to the number of drive wheels 14. Each of the corresponding number of motors may be configured to drive each of the drive wheels 14 (i.e., in a 1:1 motor to drive wheel 14 ratio). When provided in this way, the controller may provide different levels of power to each motor corresponding to each drive wheel 14, to turn the ball chasing robot 10 left or right (or straightforward or backwards). Therefore, the ball chasing robot may not require a wheel or wheels configured to steer the ball chasing robot (e.g., such as the directional wheel 16 as described below).

The first power setting may be different to the second power setting; in particular, the first power setting may be a lower power than the second power setting, i.e., in the hard floor setting, the motor may be configured to drive the wheel arrangement at a lower power than the second power setting, corresponding to the carpet setting. As will also be appreciated by the skilled person, since the hard floor setting and carpet setting utilise different power settings, the hard floor setting and carpet setting may drive the wheel arrangement at different speeds for each power setting. For the sake of brevity, when power settings are discussed in relation to hard floor and/or carpet settings (including shallow pile and deep pile carpet settings as described herein), the respective "power" setting may be also used interchangeably with the term "speed" setting, e.g., the first power setting and second power setting (etc.) may be described as a first speed setting and second speed setting (etc.), respectively. Accordingly, the first speed setting may be slower than the second speed setting.

The toy 1 may also be energy efficient, due to the use of an 'energy saving' sleep setting, which may prevent the toy 1 from being turned on for longer than is necessary. In the sleep setting, the ball chasing robot 10 may therefore not be actively searching for infrared radiation emitted by the satellite object 20. For example, if the ball chasing robot 10 does not detect any infrared radiation for a period of time (e.g., 60 seconds), corresponding to the period of inactivity as described above, the ball chasing robot 10 may enter the sleep setting (i.e., a sleep mode), such that power savings may be made. The period of time of inactivity may be 15 seconds, 30 seconds, 45 seconds, 60 seconds, 90 seconds, 120 seconds, 180 seconds, 240 seconds, 300 seconds, or any value in between the values mentioned. The period of time may be set by the end user (e.g., with a time switch).

The term "turn off" when used herein may relate to the controller electrically disconnecting a component, e.g., the infrared sensors 12, from the battery. Additionally, the controller, on putting the ball chasing robot 10 into the sleep setting, may turn off the motor (i.e., electrically disconnect the motor from the battery). The controller may be control circuitry.

Figure 4:
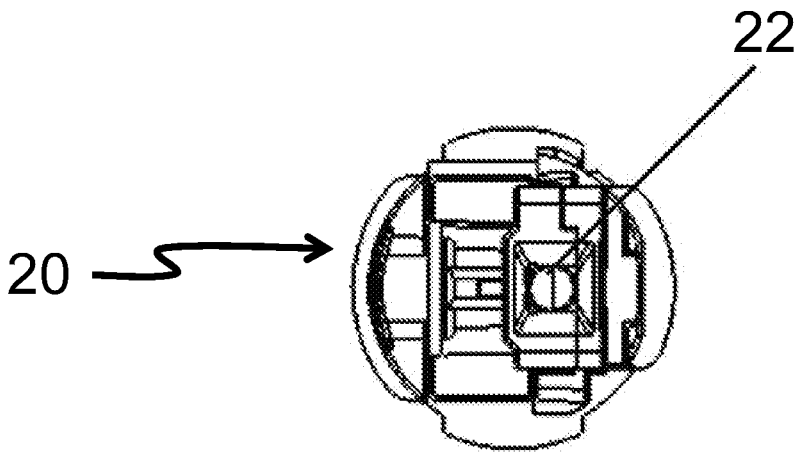
FIG. 4 is a bottom-up plan view of the satellite object of FIG. 3.

The toy 1 may include the satellite object 20 as shown in FIGS. 4 and 5. The satellite object 20 may be (but is not limited to) a ball, such as a football (i.e., a soccer ball), a basketball, an American football, or a golf ball. The satellite object 20 may be placed within a ball (not shown), such that the satellite object 20 may be used in various different configurations (i.e., used in a modular way). When provided in this way, when the satellite object 20 is placed into a ball, the ball and satellite object 20 in combination may be considered to be the satellite object 20.

The plurality of infrared sensors 12 may include at least three infrared sensors 12, as shown in FIGS. 1 and 2. The plurality of infrared sensors 12 may be configured to detect infrared radiation in a 360-degree angle around the ball chasing robot 10. The ball chasing robot 10 may therefore detect the satellite object 20 at any position around the ball chasing robot 10 on a plane parallel to a surface on which the ball chasing robot 10 is placed in use.

The ball chasing robot 10 may also have a plurality of infrared sensors 12 that do not cover a 360 degree angle around the ball chasing robot 10, and the ball chasing robot 10 may be configured to rotate (i.e., spin e.g., in place, in a circular motion) such that a 360 degree coverage is still attained. As shown in FIG. 1, the IR sensors may be located 'front-facing' on the ball chasing robot 10. When provided in this way, the ball chasing robot 10 may spin in place until infrared radiation is detected, at which point the ball chasing robot 10 may drive towards the source of the infrared radiation. When provided with such a grouping of infrared sensors 12 near the front of the ball chasing robot 10 as shown in FIGS. 1 and 2, increased accuracy of detection and direction (e.g., via triangulation when at least three infrared sensors 12 are used) may be achieved.

The carpet setting may include at least two sub-settings, including: a shallow pile carpet setting, wherein the motor may be configured to drive the wheel arrangement at the second power setting or a third power setting; and a deep pile carpet setting, wherein the motor may be configured to drive the wheel arrangement at the second power setting or the third power setting; wherein the shallow pile carpet setting and the deep pile carpet setting are different. In other words, the carpet setting may include two sub-settings suitable for driving the ball chasing robot 10 across deep pile carpet or shallow pile carpet. The shallow pile carpet setting and the deep pile carpet setting may not use the same power setting; in particular, if the shallow pile carpet setting is configured to drive the wheel arrangement at the second power setting, then the deep pile carpet setting may be configured to drive the wheel arrangement at the third power setting, and vice-versa. Accordingly, when a general carpet setting is used as described above (with no sub-settings), the second power setting may be equivalent to either the shallow pile carpet setting or the deep pile carpet setting (e.g., equivalent to when such sub-settings are present). Therefore, for example, if the deep pile carpet setting uses the second power setting, the third power setting may include the motor being configured to drive the wheel arrangement (via the controller) at a power setting lower than the second power setting, and higher than the first power setting. Alternatively, for example, if the deep pile carpet setting uses the third power setting, the second power setting may include the motor being configured to drive the wheel arrangement (via the controller) at a power setting lower than the third power setting, and higher than the first power setting.

As will be appreciated by the skilled person, whilst the terms "hard floor", "carpet", "shallow pile carpet", and "deep pile carpet" are used, the toy 1 may be used on a variety of surfaces, including, but not limited to, grass, soil, concrete, tarmac, astroturf, etc. Accordingly, the user may select the most appropriate setting for the surface on which the toy 1 will be used, or, as described herein, the ball chasing robot 10 may automatically change the power setting based on resistance to movement (e.g., wheel torque as described below).

The ball chasing robot 10 may include a floor mode switch configured to switch the ball chasing robot 10 between the hard floor setting and the carpet setting and, if present, the at least two sub-settings. Accordingly, the ball chasing robot 10 may therefore be set manually by the user to the most appropriate setting.

The ball chasing robot 10 may further include a wheel torque measuring system. The ball chasing robot 10 may be configured to switch from the hard floor setting to the carpet setting automatically when resistance to rotation exceeds a threshold detected by the wheel torque measuring system. The wheel torque measuring system may be a wheel torque transducer. The wheel torque measuring system may therefore measure the amount of resistance to wheel rotating when moving and communicate measurements to the controller. When configured in this way, the ball chasing robot 10 may travel across mixed surfaces and the controller may adapt the power settings to the most appropriate power setting, without the need for a user to manually switch the setting. Automatic changing of the setting (e.g., hard floor, carpet (optionally shallow pile and deep pile)) may reduce the amount of wear on the motor and/or drive wheel arrangement, e.g., if the ball chasing robot 10 travels from a hard floor to deep pile carpet.

As shown in FIGS. 1 and 2, the wheel arrangement may further include a directional wheel 16 (or directional wheels) configured to steer the ball chasing robot 10 in the direction of the satellite object 20. The directional wheel(s) 16 may be turned by a respective motor(s). When configured in this way, the two drive wheels 14 may be non-steering, such that both wheels 14 may always be provided with the same power, such that only the directional wheel 16 steers the ball chasing robot 10. The directional wheel 16 may alternatively work in conjunction with the drive wheels 14 (as described above, e.g., if each drive wheel 14 has its own respective motor), such that steering efficiency of the ball chasing robot 10 may be increased. The directional wheel 16 may also be configured to drive the ball chasing robot 10 (i.e., using a motor), and the directional wheel 16 may therefore allow for the ball chasing robot 10 to spin in place without the need to provide power to the drive wheels 14.

On detecting infrared radiation from the satellite object 20, the controller may be configured to revert the ball chasing robot 10 to the play setting. Accordingly, once an infrared signal is detected by the infrared sensors 12, the controller may be considered to turn the ball chasing robot 10 on (i.e., to leave the sleep setting and go into the play setting). The ball chasing robot 10 may therefore monitor for infrared radiation in sleep setting. The monitoring may be continuous or may be intermittent. For example, in the sleep setting, the controller may turn off the infrared sensors 12 for a preset period of time, and then turn on the infrared sensors 12 for another preset period of time (and repeat the process), such that the monitoring may be a 'pulsed' type of monitoring. For example, the infrared sensors 12 may be turned on for up to a second, or 2 seconds, or 5 seconds, or 10 seconds, and the infrared sensors may be turned off for up to 10, or 20, or 30, or 40, or 50, or 60 seconds. When provided in this way, power savings may be achieved, whilst retaining the ball chasing robot's 10 ability to revert to the play setting without user intervention.

The toy 1 may further include an accelerometer configured to detect motion of the toy 1. On detecting motion of the toy 1, the controller may be configured to revert the toy 1 to the play setting. The (or each) accelerometer may be placed in the ball chasing robot 10 and/or the satellite object 20. In other words, there are provided options for the use of an accelerometer:

1) The ball chasing robot 10 may further include an accelerometer configured to detect motion of the ball chasing robot 10. On detecting motion of the ball chasing robot 10, the controller may be configured to revert the ball chasing robot 10 to the play setting. Accordingly, when the ball chasing robot 10 is in the sleep setting (e.g., after a period of inactivity), the ball chasing robot 10 may 'wake up' when, e.g., picked up by a user to be placed elsewhere, e.g., near the satellite object 20.

2) The satellite object 20 may further include an accelerometer configured to detect motion of the satellite object 20. On detecting motion of the satellite object 20, a controller of the satellite object 20 may be configured to enter the satellite object 20 to a play setting. In other words, the satellite object 20 may enter a sleep mode if no motion is detected for a period of time (e.g., 60 seconds). Such an arrangement may provide power savings in the satellite object 20. This is described in more detail below.

As shown in FIG. 1, the toy 1 may further include a play switch 18 configured to place the ball chasing robot 10 in the play setting or the sleep setting. Accordingly, the end user may manually turn the ball chasing robot 10 to the sleep setting to save power, or may bring the ball chasing robot 10 back to the play setting manually.

When the plurality of infrared sensors 12 do not detect infrared radiation, after a period of non-detection time (e.g., when the ball chasing robot 10 is first turned on and has not detected infrared radiation at all, or alternatively, when the plurality of infrared sensors 12 have previously detected infrared radiation and subsequently do not detect infrared radiation), the controller may be configured to drive the wheel arrangement such that the ball chasing robot 10 drives in an area, or the ball chasing robot 10 spins in place. Accordingly, the ball chasing robot 10 may effectively go 'searching' within a preset area until infrared radiation is detected, or may stay in place and scan the surrounding area until infrared radiation is detected. The period of non-detection time may be instant, or may be after a longer period of time, such as 30 seconds.

When the plurality of infrared sensors 12 detect infrared radiation and subsequently do not detect infrared radiation, the controller may be configured, after a period of non-detection time, to drive the ball chasing robot 10 in a direction of a last known location, the last known location corresponding to a direction in which the plurality of infra-red sensors 12 detected infrared radiation and subsequently did not detect infrared radiation. In other words, the ball chasing robot 10 may be configured to drive in the direction of the last known detection of the infrared radiation emitted by the satellite object 20. The toy 1 may alternatively be configured to drive around the location at which the ball chasing robot 10 was at the point when the infrared radiation emitted by the satellite object 20 was no longer detected by the infrared sensors 12 of the toy 1. The period of non-detection time may be the same as the period of non-detection time as described above, or different to the period of non-detection time as described above. The controller may be configured to enter the sleep setting after a period of non-detection time, as described herein, such that the ball chasing robot 10 may not drive in the direction of the last known location for too long.

As shown in FIGS. 4 and 5, the satellite object 20 may include at least five infrared emitters 22. The at least five infrared emitters 22 positioned within a satellite housing and configured to emit infrared radiation in a 360 degree radius in three dimensions. When configured in this way, the satellite object 20 may be positioned in any three dimensional orientation and emit infrared radiation such that it may be readily detected by the infrared sensors 12 on the ball chasing robot 10. As shown in FIGS. 4 and 5, the infrared emitters 22 may be placed on a top portion and a bottom portion of the satellite object. Additionally or alternatively, the infrared emitter(s) 22 may be placed on a side or sides of the satellite object 20. It will be appreciated that the satellite object 20 may include fewer infrared emitters 22, e.g., at most 2, or 3, or 4 infrared emitters 22. It will also be appreciated by the skilled person that the satellite object 20 may include more emitters, e.g., at least 6, 7, 8, 9, or 10 infrared emitters 22. The infrared emitters 22 may be an infrared light emitting diode.

The satellite object 20 may include a satellite controller configured to receive power from a satellite battery and configured to place the satellite object 20 into a satellite play setting, wherein the satellite controller is configured to turn on the infrared emitters 22, and a satellite sleep setting, wherein the satellite controller is configured to turn off the infrared emitters 22. The satellite sleep setting may be entered automatically after a period of inactivity. Such a configuration of the satellite object 20 may provide for power savings after periods of inactivity of the satellite object 20.

An exemplary, non-limiting, operating principle for the toy 1 is described as follows. The battery may be first connected to the ball chasing robot 10. A power switch, if present, may be turned on and the ball chasing car 10 may enter the sleep setting or the play setting (based on the position of the play switch 18, if present). If present, the floor mode switch may be operated as described above to select one of the operating modes (e.g., hard floor, carpet (optionally shallow pile or deep pile). The infrared sensors 12 may be infrared receiving tubes with an angular sector distribution of about 90 degrees. The infrared tubes may have an angular sector distribution of about 120, or 160, or 180 degrees. The ball chasing robot may start to search for infrared radiation once the ball chasing robot 10 is placed into the play setting by the controller. As shown in FIG. 1, because the three receiver tube directions may be different, and the distance from the infrared radiation emitted by the satellite object 20 may also be different. Accordingly, the received signal strength of the infrared radiation may be different. The controller may analyse the signal voltage (from the infrared radiation) received by the three infrared receiving tubes, and the controller may then choose the strongest signal to drive the ball chasing car 10 towards, by driving the wheel arrangement. When two motors are present (i.e., for each drive wheel 14 as shown in FIGS. 1 and 2), the controller may control the two rotating motors straight, turn left or right. When the ball is on the left side of the ball chasing robot 10, the left receiver tube signal will be strongest, and the controller would drive the ball chasing robot 10 in a left turn (by providing more power to the rightmost wheel than the leftmost wheel. When the ball is on the right side of the ball chasing robot 10, the right receiver tube signal will be strongest, and the controller would drive the ball chasing robot 10 in a right turn (by providing more power to the leftmost wheel than the rightmost wheel). When the satellite object 20 is at or near the middle (of the front of the ball chasing robot 10 as shown in FIG. 1), the signal intensity may be the same, and therefore the power to each motor for each wheel may be the same, such that the ball chasing robot 10 will follow the direction of the ball. As described herein, the play setting may be divided into carpet mode and hard floor mode, at least. Due to the high driving resistance on the carpet, the speed might need to be higher than the hard floor mode, or at least drive when wheel arrangement at a higher power than the hard floor mode. Accordingly, the controller may such speed and/or power regulation by adjusting the power to the wheel arrangement as described herein.

When used in this specification and claims, the terms "comprises" and "comprising" and variations thereof mean that the specified features, steps or integers are included. The terms are not to be interpreted to exclude the presence of other features, steps or components.

The invention may also broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

Protection may be sought for any features disclosed in any one or more published documents referenced herein in combination with the present disclosure.

Although certain example embodiments of the invention have been described, the scope of the appended claims is not intended to be limited solely to these embodiments. The claims are to be construed literally, purposively, and/or to encompass equivalents.

What is claimed is:

1. A toy, including a ball chasing robot including:
a controller configured to receive power from a battery;
a plurality of infrared sensors configured to detect infrared radiation emitted by a satellite object, the plurality of infrared sensors connected to the controller, wherein the plurality of infrared sensors includes at least three infrared sensors;

a motor configured to drive a wheel arrangement, the wheel arrangement including at least two drive wheels, wherein:

the controller is configured to control the motor and wheel arrangement to drive the ball chasing robot towards the infrared radiation emitted by the satellite object detected by the plurality of infrared sensors;

wherein the ball chasing robot includes a plurality of settings, the plurality of settings including:

a) a play setting, wherein the controller is configured to control the motor, such that the ball chasing robot is driven towards the source of the infrared radiation emitted by the satellite object, and a sleep setting wherein the controller is configured to turn off the plurality of sensors, wherein the sleep setting is entered automatically after a period of inactivity; and b) a hard floor setting, wherein the motor is configured to drive the wheel arrangement at a first power setting, and a carpet setting, wherein the motor is configured to drive the wheel arrangement at a second power setting, wherein the first power setting is a lower power than the second power setting;

the ball chasing robot further including:

a switch configured to switch the ball chasing robot between the hard floor setting and the carpet setting;

a play switch configured to place the ball chasing robot in the play setting or the sleep setting; and at least two motors configured to drive the wheel arrangement, wherein each of the at least two motors are configured to drive each of the at least two drive wheels;

wherein, when the plurality of infrared sensors do not detect infrared radiation, after a period of non-detection time, the controller is configured to drive the wheel arrangement such that the ball chasing robot spins in place;

wherein the toy includes the satellite object, and wherein:

the satellite object includes a satellite controller configured to receive power from a satellite battery and configured to place the satellite object into a satellite play setting, wherein the satellite controller is configured to turn on at least one infrared emitter, and a satellite sleep setting, wherein the controller is configured to turn off the at least one infrared emitter, wherein the satellite sleep setting is entered automatically after a period of inactivity, the satellite object includes a satellite accelerometer configured to detect motion of the satellite object, wherein, on detecting motion of the satellite object, the satellite controller is configured to revert the satellite object to the satellite play setting; and the satellite object is within a ball.

2. The toy according to claim 1, wherein the plurality of infrared sensors are configured to detect infrared radiation in a 360-degree angle around the ball chasing robot.

3. The toy according to claim 1, wherein the carpet setting includes at least two sub-settings, including:

a shallow pile carpet setting, wherein the motor is configured to drive the wheel arrangement at the second power setting or a third power setting; and a deep pile carpet setting, wherein the motor is configured to drive the wheel arrangement at the second or the third power setting; wherein:

the shallow pile carpet setting and the deep pile carpet setting are different.

4. The toy according to claim 3, wherein, when:

the shallow pile carpet setting is configured such that the motor is configured to drive the wheel arrangement at the second power setting; and the deep pile carpet setting is configured such that the motor is configured to drive the wheel arrangement at the third power setting, the third power setting is a higher power than the second power setting; or when:

the shallow pile carpet setting is configured such that the motor is configured to drive the wheel arrangement at the third power setting; and the deep pile carpet setting is configured such that the motor is configured to drive the wheel arrangement at the second power setting, the second power setting is a higher power than the third power setting.

5. The toy according to claim 3, wherein the switch is configured to switch the ball chasing robot between the at least two sub-settings.

6. The toy according to claim 1, further including a wheel torque measuring system, the ball chasing robot configured to switch from the hard floor setting to the carpet setting automatically when resistance to rotation exceeds a threshold detected by the wheel torque measuring system.

7. The toy according to claim 1, wherein the wheel arrangement further includes a directional wheel configured to steer the ball chasing robot in the direction of the satellite object.

8. The toy according to claim 1, wherein on detecting an infrared signal from the satellite object, the controller is configured to revert the ball chasing robot to the play setting.

9. The toy according to claim 1, further including an accelerometer configured to detect motion of the ball chasing robot, wherein, on detecting motion of the ball chasing robot, the controller is configured to revert the ball chasing robot to the play setting.

10. The toy according to claim 1, wherein the satellite object includes at least five infrared emitters, the at least five infrared emitters positioned within a satellite housing and configured to emit infrared radiation in a 360-degree radius in three dimensions.

11. The toy according to claim 1, wherein the quantity of the at least two motors corresponds to the quantity of the at least two drive wheels.

12. A toy, including a ball chasing robot including:

a controller configured to receive power from a battery;

a plurality of infrared sensors configured to detect infrared radiation emitted by a satellite object, the plurality of infrared sensors connected to the controller, wherein the plurality of infrared sensors includes at least three infrared sensors;

a motor configured to drive a wheel arrangement, the wheel arrangement including at least two drive wheels, wherein:

the controller is configured to control the motor and wheel arrangement to drive the ball chasing robot towards the infrared radiation emitted by the satellite object detected by the plurality of infrared sensors;

wherein the ball chasing robot includes a plurality of settings, the plurality of settings including:

a play setting, wherein the controller is configured to control the motor, such that the ball chasing robot is driven towards the source of the infrared radiation emitted by the satellite object, and a sleep setting wherein the controller is configured to turn off the plurality of sensors, wherein the sleep setting is entered automatically after a period of inactivity; and a hard floor setting, wherein the motor is configured to drive the wheel arrangement at a first power setting, and a carpet setting, wherein the motor is configured to drive the wheel arrangement at a second power setting, wherein the first power setting is a lower power than the second power setting;

the ball chasing robot further including:

a switch configured to switch the ball chasing robot between the hard floor setting and the carpet setting;

a play switch configured to place the ball chasing robot in the play setting or the sleep setting; and at least two motors configured to drive the wheel arrangement, wherein each of the at least two motors are configured to drive each of the at least two drive wheels;

wherein, when the plurality of infrared sensors do not detect infrared radiation, after a period of non-detection time, the controller is configured to drive the wheel arrangement such that the ball chasing robot spins in place;

wherein the toy includes the satellite object, and wherein:

the satellite object includes a satellite controller configured to receive power from a satellite battery and configured to place the satellite object into a satellite play setting, wherein the satellite controller is configured to turn on at least one infrared emitter, and a satellite sleep setting, wherein the controller is configured to turn off the at least one infrared emitter, wherein the satellite sleep setting is entered automatically after a period of inactivity, and the satellite object includes a satellite accelerometer configured to detect motion of the satellite object, wherein, on detecting motion of the satellite object, the satellite controller is configured to revert the satellite object to the satellite play setting, and the satellite object is modularly placeable within a ball.

\* \* \* \* \*